(12) United States Patent
Coyle et al.

(10) Patent No.: US 12,460,844 B2
(45) Date of Patent: Nov. 4, 2025

(54) BALL SEAL FOR THERMAL SENSOR ASSEMBLY OF THERMOSTATIC EXPANSION VALVE

(71) Applicant: Parker-Hannifin Corporation, Cleveland, OH (US)

(72) Inventors: Eric R. Coyle, Chesterfield, MO (US); Dylan T. Yegge, Washington, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/693,355

(22) PCT Filed: Sep. 14, 2022

(86) PCT No.: PCT/US2022/076402
§ 371 (c)(1),
(2) Date: Mar. 19, 2024

(87) PCT Pub. No.: WO2023/107761
PCT Pub. Date: Jun. 15, 2023

(65) Prior Publication Data
US 2024/0426392 A1 Dec. 26, 2024

Related U.S. Application Data

(60) Provisional application No. 63/287,111, filed on Dec. 8, 2021.

(51) Int. Cl.
*F25B 41/335* (2021.01)
(52) U.S. Cl.
CPC .................. *F25B 41/335* (2021.01)
(58) Field of Classification Search
None
See application file for complete search history.

(56) References Cited

U.S. PATENT DOCUMENTS 2,152,781 A * 4/1939 Wile ............... F25B 41/335
137/799
2,472,149 A * 6/1949 Dillman ........... F25B 41/335
62/212
(Continued)

FOREIGN PATENT DOCUMENTS

CN 1912432 A 2/2007
CN 203115261 U 8/2013
(Continued)

OTHER PUBLICATIONS

Translation of WO 2011/108823 (Year: 2011).*
(Continued)

*Primary Examiner* — Umashankar Venkatesan
(74) *Attorney, Agent, or Firm* — Renner, Otto, Boisselle & Sklar, LLP

(57) ABSTRACT

A thermal sensor assembly for a thermostatic expansion valve includes an enclosure that forms an enclosed interior space containing a thermal sensing fluid, and an opening in the enclosure for charging the thermal sensing fluid. A ball is arranged in the opening and forms a fluid seal between a sealing surface and a sealing interface of the assembly. The sealing surface may be made with a material that is softer than a material of the sealing interface, such that the sealing surface conforms to the sealing interface and fluidly seals the thermal sensing fluid in the enclosed interior space of the enclosure. The opening may include a tapered lead-in hole that tapers radially inwardly as the lead-in hole extends toward the interior space to thereby form the seal. A cover may be attached to an exterior surface of the enclosure to hold the ball in the opening to form the seal.

18 Claims, 6 Drawing Sheets

(56) References Cited

U.S. PATENT DOCUMENTS

| | | | | |
|---|---|---|---|---|
| 2,564,421 | A * | 8/1951 | Carter | F25B 41/335 62/211 |
| 5,127,237 | A * | 7/1992 | Sendo | F25B 41/335 236/92 B |
| 5,269,459 | A * | 12/1993 | Thompson | F25B 41/335 236/92 B |
| 5,924,629 | A * | 7/1999 | Kobayashi | F25B 41/335 219/137 R |
| 5,961,038 | A * | 10/1999 | Okada | F25B 41/335 236/92 B |
| 5,996,899 | A * | 12/1999 | Watanabe | F16K 31/002 236/92 B |
| 6,233,956 | B1 * | 5/2001 | Katayama | F25B 41/20 62/197 |
| 6,352,207 | B1 * | 3/2002 | Kawakami | F25B 41/335 236/92 B |
| 6,415,985 | B1 * | 7/2002 | Minowa | F25B 41/335 236/92 B |
| 6,626,365 | B2 * | 9/2003 | Kobayashi | F25B 41/335 236/92 B |
| 6,776,351 | B2 * | 8/2004 | Kobayashi | F25B 41/335 236/92 B |
| 6,848,624 | B2 * | 2/2005 | Dianetti | F25B 41/335 236/92 B |
| 7,185,826 | B2 * | 3/2007 | Nanbu | F25B 41/335 236/92 B |
| 7,624,930 | B2 * | 12/2009 | Honda | F25B 41/335 236/92 B |
| 10,436,484 | B2 * | 10/2019 | Matsuda | F25B 41/335 236/92 B |
| 10,551,102 | B2 | 2/2020 | Rasmussen | |
| 12,061,025 | B2 * | 8/2024 | Aoki | F16K 31/1266 |
| 12,092,380 | B2 * | 9/2024 | Aoki | F16K 31/002 |
| 2002/0185621 | A1 * | 12/2002 | Kobayashi | F25B 41/335 251/61.3 |
| 2022/0146160 | A1 * | 5/2022 | Tomitsuka | F25B 41/335 |
| 2023/0012455 | A1 * | 1/2023 | Aoki | F25B 41/335 |
| 2023/0034594 | A1 * | 2/2023 | Rasmussen | F25B 41/325 |

FOREIGN PATENT DOCUMENTS

| | | | |
|---|---|---|---|
| CN | 203177551 U | 9/2013 | |
| DE | 102006020457 A1 | 11/2007 | |
| EP | 0718569 A1 | 6/1996 | |
| WO | 1996007853 A1 | 3/1996 | |
| WO | WO-2011108823 A2 * | 9/2021 | F25B 41/062 |
| WO | 2022235632 A1 | 11/2022 | |

OTHER PUBLICATIONS

International Search Report and Written Opinion issued for corresponding International Patent Application No. PCT/US2022/076402, mailed Dec. 19, 2022.

Written Opinion of the International Preliminary Examining Authority issued for corresponding International Patent Application No. PCT/US2022/076402, mailed Nov. 29, 2023.

* cited by examiner

BALL SEAL FOR THERMAL SENSOR ASSEMBLY OF THERMOSTATIC EXPANSION VALVE

RELATED APPLICATIONS

This application is a national phase of International Application No. PCT/US2022/076402 filed Sep. 14, 2022, which claims the benefit of U.S. Provisional Application No. 63/287,111 filed Dec. 8, 2021, each of which is hereby incorporated by reference in its entirety.

TECHNICAL FIELD

The present disclosure relates generally to thermostatic expansion valves, and more particularly to the sealing of the thermal sensor assembly attached to the thermostatic expansion valve.

BACKGROUND

A thermostatic expansion valve (TEV) is a common component in vapor-compression refrigerant system that controls the amount of expanded refrigerant released into the evaporator, which can regulate the superheating of the refrigerant that flowing out of the evaporator to a steady value. To facilitate such control, TEVs typically have a thermal sensor assembly including a bulb (also referred to as a thermal sensing bulb) that is thermally connected to the output line of the evaporator so that the temperature of the refrigerant leaving the evaporator can be sensed by a sensing fluid contained in the sensing bulb. When heated, the sensing fluid in the bulb increases in pressure, which this pressure is communicated to a power element of the TEV. The power element receiving this increased pressure signal from the bulb then forces the TEV to open and increases the flow of expanded refrigerant leaving the valve. In this manner, the TEV can dynamically adjust the flow of refrigerant through the evaporator based on the temperature sensed by the sensing bulb.

A conventional sensing bulb assembly typically has a first opening connected to a capillary tube that communicates the change in sensing fluid pressure to the TEV for dynamically modulating the flow of expanded refrigerant through the valve. The bulb assembly also typically has a charge opening that is used for charging the sensing fluid into the bulb. One common way to charge the bulb is through a charging tube brazed into this charge opening of the bulb assembly. After the sensing fluid is charged into the bulb, the charging tube is ultrasonically crimped to contain the sensing fluid in the bulb. Other ways of sealing the bulb include soldering the charging tube shut, or mechanically deforming the charging tube shut.

SUMMARY

At least one problem with conventional TEVs is that the charging tube is flexible and requires manipulation before and after the charging process, in which case the charged sensing fluid can leak during this manipulation. Accordingly, such conventional charging and sealing techniques require additional material, labor, and equipment to mitigate the leakage issue. Therefore, there is a need to decrease or eliminate the opportunity for leakage, and reduce the number of parts, the amount of material, labor, and/or equipment needed to adequately seal an enclosure of the thermal sensor assembly containing the thermal sensing fluid.

At least one aspect of the present disclosure solves one or more problems of conventional thermal sensor assemblies by providing a ball seal in the charge opening of the sensing fluid enclosure, which reduces the complexity of the assembly and/or enhances the sealing capability of the enclosure. Such a ball seal may eliminate the need for the charge tube, and therefore can mitigate the issues associated with leakage caused by manipulation of the charge tube, for example.

According to an aspect, a thermal sensor assembly for a thermostatic expansion valve, includes: an enclosure forming an enclosed interior space containing a thermal sensing fluid, the enclosure having a charge opening configured for charging the thermal sensing fluid into the enclosure; and a ball arranged in the charge opening and forming a fluid seal between a sealing surface and a sealing interface; wherein the sealing interface is formed by a first material and the sealing surface is formed by a second material having a greater softness than the first material such that the sealing surface conforms to the sealing interface and fluidly seals the thermal sensing fluid in the enclosed interior space of the enclosure.

According to another aspect, a method of sealing an enclosure of a thermal sensor assembly for a thermal expansion valve includes the steps: attaching a cap to an opening end of the enclosure; forming a charge hole on the cap; charging a refrigerant into the enclosure through the charge hole; and pressing a ball into the charge hole, wherein the ball is larger in size than the charge hole and forms a fluid seal between a sealing surface and a sealing interface of the assembly; wherein the sealing interface is formed by a first material and the sealing surface is formed by a second material having a greater softness than the first material such that the sealing surface conforms to the sealing interface and fluidly seals the thermal sensing fluid in the enclosed interior space of the enclosure.

According to another aspect, a thermal sensor assembly for a thermostatic expansion valve, includes: an enclosure forming an enclosed interior space containing a thermal sensing fluid, the enclosure having a charge opening configured for charging the thermal sensing fluid into the enclosure; and a ball arranged in the charge opening and forming a seal that fluidly seals the thermal sensing fluid in the enclosed interior space of the enclosure; wherein the charge opening includes a tapered lead-in hole formed by a portion of the enclosure, the lead-in hole including a tapered surface that tapers radially inwardly as the tapered surface extends toward the enclosed interior space, the tapered surface sealingly engaging against the ball to form the seal.

According to another aspect, a method of sealing an enclosure of a thermal sensor assembly for a thermal expansion valve includes the steps: attaching a cap to an opening end of the enclosure; forming a charge hole on the cap; charging a refrigerant into the enclosure through the charge hole; and pressing a ball into the charge hole, wherein the ball is larger in size than the charge hole to form a seal; wherein the charge opening is formed as a lead-in hole that protrudes into the enclosed interior surface of the enclosure, the lead-in hole having a tapered surface that tapers radially inwardly toward the enclosed interior space and sealingly engages against the ball to form the seal.

According to another aspect, a thermal sensor assembly for a thermostatic expansion valve, includes: an enclosure forming an enclosed interior space containing a thermal sensing fluid, the enclosure having a charge opening configured for charging the thermal sensing fluid into the enclosure; a ball arranged in the charge opening and forming a seal that fluidly seals the thermal sensing fluid in the enclosed interior space of the enclosure; and a cover attached to an exterior surface of the enclosure and configured to hold the ball in the charge opening to form the seal.

According to another aspect, a method of sealing an enclosure of a thermal sensor assembly for a thermal expansion valve includes the steps: attaching a cap to an opening end of the enclosure; forming a charge hole on the cap; charging a refrigerant into the enclosure through the charge hole; pressing a ball into the charge hole, wherein the ball is larger in size than the charge hole to form a seal; and attaching a cover to the cap to hold the ball in the charge hole and form the seal.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects according to the present disclosure have particular application to thermostatic expansion valves (TEVs) for use in refrigerant systems, and thus will be described below chiefly in this context. It is understood, however, that the principles and aspects according to the present disclosure may be applicable to other TEVs for other systems, such as residential, commercial, or automotive air conditioning or refrigeration systems, for example.

Figure 1:
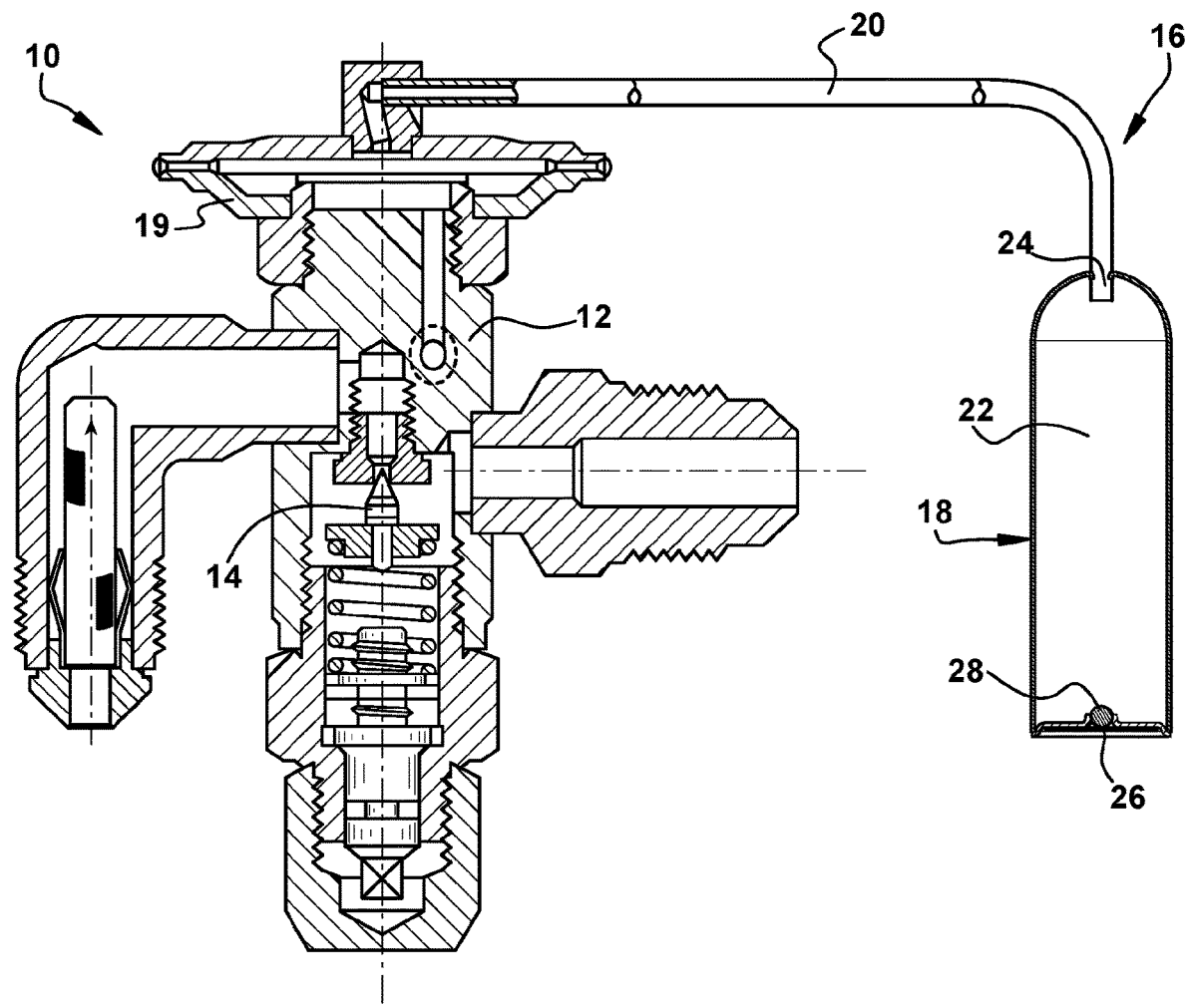
FIG. 1 is a cross-sectional side view of a thermostatic expansion valve connected to an exemplary thermal sensor assembly according to an embodiment of the present disclosure.

FIG. 1 shows a cross-sectional view of an exemplary thermostatic expansion valve (TEV) 10 that may be used in an exemplary refrigerant system (not shown). The TEV 10 includes a valve body 12, a valve member 14 in a flow path of the valve body 12 for modulating flow of refrigerant through the valve, and a thermal sensor assembly 16. The thermal sensor assembly 16 generally includes an exemplary enclosure 18 that contains a thermal sensing fluid, and a capillary tube 20 that fluidly connects the enclosure 18 to a power element 19 of the TEV 10. The power element 19 serves as an actuator to the valve member 14, and may include a diaphragm or other suitable structure that is responsive to a pressure signal from the bulb 18 to open or close the valve member 14 for dynamically modulating flow of refrigerant through the TEV 10 based on temperature and pressure changes of the sensing fluid contained in the bulb 18. In the illustrated embodiment, the TEV 10 is a bulb-style TEV, in which the enclosure 18 is formed as a bulb (also referred to herein with reference numeral 18), such that the thermal sensor assembly 16 is in the form of a thermal sensing bulb assembly (also referred to herein with reference numeral 16).

The refrigerant system containing the TEV 10 may be any suitable refrigeration system, such as of the compressor-condenser-evaporator type. In such a system, the TEV 10 and the sensing bulb assembly 16 operate as a throttling device for controlling the amount of the working fluid (e.g., refrigerant in gaseous and/or liquid form) injected into the system's evaporator based on the evaporator outlet temperature and pressure. The thermal sensing bulb assembly 16 generally may be located in a position of the system that is selected to provide feedback information about the thermal condition of the refrigerant system by the sensing bulb assembly 16, which is used by the TEV 10 to make changes in working fluid flow to effect changes in the thermal condition of the system. Typically, the location of the sensing bulb assembly 16 is at the suction line between the output of the evaporator and the input of the compressor. Generally, the sensing bulb assembly 16 communicates with the TEV 10 via expansion or contraction of the sensing fluid in the bulb 18 based on temperature changes experienced by the sensing fluid in the bulb 18, thereby affecting operation of the TEV 10. The sensing fluid may be a refrigerant, which may be the same as the working fluid, or may be any other suitable fluid. A ballast material may be contained in the sensing bulb 18 to dampen the rate of sensing fluid expansion or contraction within the bulb 18, thereby attenuating rapid changes in the sensing fluid due to transient changes in the thermal condition of the refrigerant system.

As shown in FIGS. 1-4, the bulb 18 forms an enclosed interior space 22 that contains the thermal sensing fluid. The bulb 18 includes a first opening 24 fluidly connected to the capillary tube 20 for communicating the pressure changes in the sensing fluid to the TEV 10. The bulb 18 also includes a second opening 26 configured for charging the thermal sensing fluid into the bulb 18. As shown with particular reference to FIGS. 2-4, the exemplary bulb assembly 16 includes a ball 28 arranged in the second opening 26 which forms a seal that fluidly seals the thermal sensing fluid in the enclosed interior space 22 of the bulb 18. The use of the ball 28 to form the seal provides a simpler design for the bulb assembly 16, and also may mitigate issues associated with manipulation of the assembly during the sealing process, thereby reducing the possibility of leakage of the sensing fluid from the bulb 18.

To provide suitable sealing functionality, the process of installing the ball 28 may include first charging the sensing fluid into the bulb 18 through the second opening 26 (also referred to as the charge opening 26), and then inserting the ball 28 into the charge opening 26. Generally, such charging may occur after assembly of the capillary tube 20 to the bulb 18 and to the TEV 10. The ball 28 may be larger in size than the charge opening 26 so that the portion of the bulb 18 forming the opening 26 sealingly engages against the ball 28. In exemplary embodiments, the ball 28 is sized to provide an interference fit with a portion of the bulb 18 forming the opening 26. In the illustrated embodiment, for example, the interference fit may be in the range from 0.001-in. to 0.005-in., which may be provided by having a diameter of the charge opening 26 of about 0.095-in. and a diameter of the ball 28 of about 0.098-in, for example.

In exemplary embodiments, the portion of the bulb 18 having the charge opening 26 is formed as a cap 30 that is attached to a main body portion 32 of the bulb 18. As shown, the main body portion 32 may have an elongated bulbous form which constitutes a majority of the enclosed interior space 22. The main body portion 32 is end-capped with the cap 30, which may be attached in any suitable manner, such as via welding at a joint 34. The main body portion 32 and the cap 30 may be made with any suitable material that can withstand the pressure environment (e.g., up to 3,000 psi) and provide chemical compatibility with the refrigerant system environment. For example, the cap 30 and/or main body portion 32 of the bulb 18 may include a suitable steel, and/or may include copper, copper alloys, or the like. The ball 28 forming the ball seal also may have any suitable form and be made of any suitable material. For example, the ball 28 may be a spherical ball made with steel, such as stainless steel. The ball 28, cap 30, and/or main body portion 32 may be made to be compatible with each other to reduce the effects of galvanic corrosion, for example.

The sealing engagement of the ball 28 with the portion of the bulb 18 forming the opening 26 may be enhanced by materials selection. In exemplary embodiments, the ball 28 is arranged in the charge opening 26 to form a fluid seal between a sealing surface 36 and a sealing interface 35, in which the sealing interface 35 is formed by a first material and the sealing surface 36 is formed by a second, different material having a greater softness than the first material, such that the sealing surface 36 conforms to the sealing interface 35 and fluidly seals the thermal sensing fluid in the enclosed interior space 22 of the enclosure 18. For example, in the illustrated embodiment, the charge opening 26 is formed by the portion of the bulb 18 having the sealing surface 36 that is made with a softer material than the material of the ball 28. In this manner, the sealing surface 36 forms a gasket that conforms to the outer surface of the ball 28, which enhances the sealability of the bulb 18. In the illustrated embodiment, for example, the sealing surface 36 of the bulb 18 is made with copper or copper alloy and the ball 28 is made of steel, such that the copper or copper alloy of the sealing surface 36 conforms to the outer surface of the steel ball 28 when the ball is pressed into place in the opening 26. This conformance helps to fill the gaps around the ball 28, thereby enhancing sealing performance.

Because the cap 30 of the bulb 18 maintains strength under pressure, the cap 30 may be formed by a layered or laminated material that provides the sealing surface 36 as a layer 37 having a softer material than a material forming a substrate layer 38 of the cap 30. For example, the cap 30 may include a layer of copper, copper alloy, or other soft material (e.g., softer than the ball 28) at the sealing surface 26, and may include steel or other harder material (e.g., harder than the sealing surface 26) as the substrate layer 38 of the cap 30 to maintain strength and pressure performance of the bulb 18. In the illustrated embodiment, the cap 30 is a laminated material made with a steel substrate 38 that is roll-bonded with a copper or copper-alloy layer 37 across an inner surface of the cap 30 that forms the sealing surface 36. In experimental tests, it was found that a thickness of the copper or copper-alloy layer 37 in a range from 0.003 in. to 0.005 in. was sufficient to improve the seal.

As shown, the sensing bulb assembly 16 also may include a cover 42 that is attached to an exterior surface of the bulb 18 and configured to hold the ball 28 in the charge opening 26 to aid in forming the seal. The cover 42 may have any suitable form for holding the ball 28 in the charge opening 26 and/or for attaching to the bulb 18. For example, in the illustrated embodiment, the cover 42 is formed as a flat disc that fits within a recessed area 44 formed by the cap 30 of the bulb 18. In this manner, the cover 42 has a flat 46 that lies in a plane that is transverse to, and offset from, the axial orientation of the charge opening 26 to thereby hold the ball 28 in the charge opening 26. In exemplary embodiments, the ball 28 is sized to fit and seal in the charge opening 26 such that the ball 28 does not protrude beyond the flat 46 of the cover 42 when fully inserted into the opening 26. This facilitates assembly of the cover 42 to the bulb 18 while providing adequate holding force for the ball 28.

Figure 2:
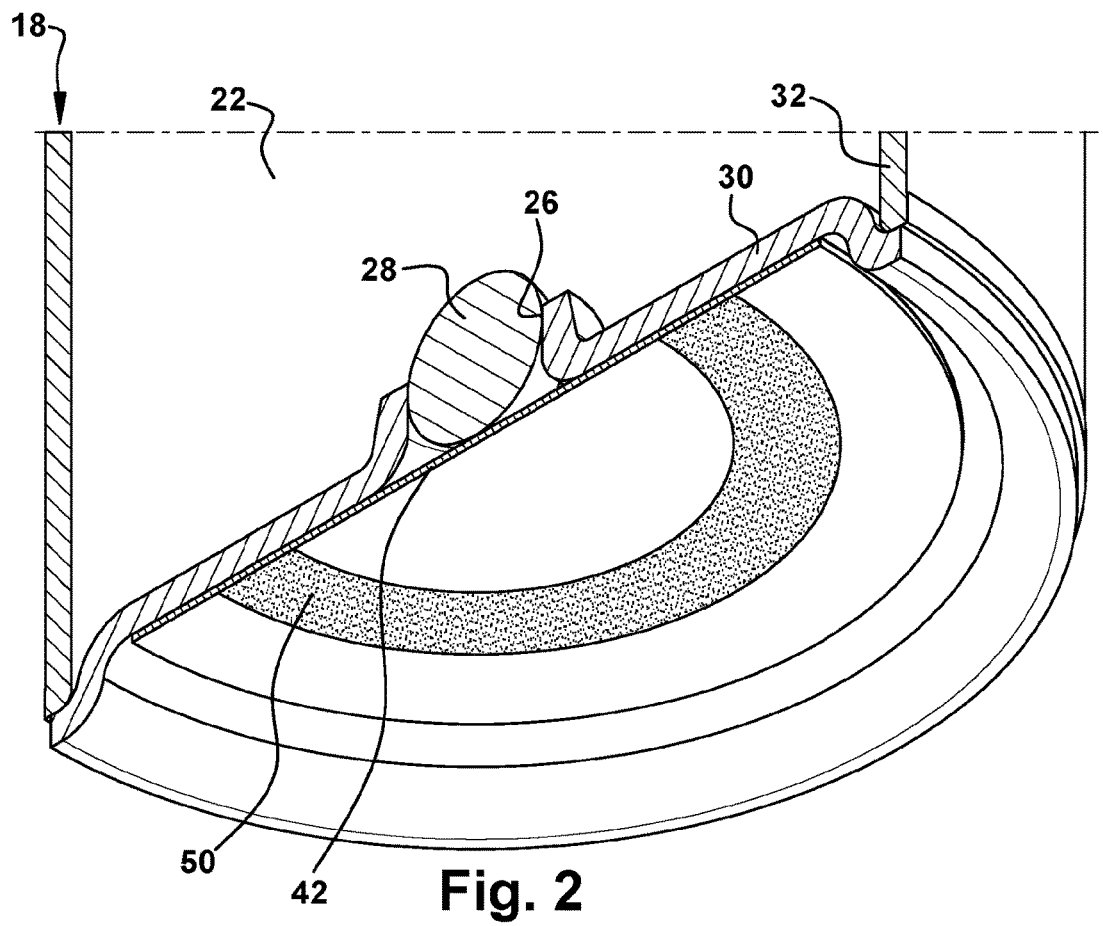
FIG. 2 is a cross-sectional perspective view of a portion of the thermal sensor assembly shown in FIG. 1.
Figure 3:
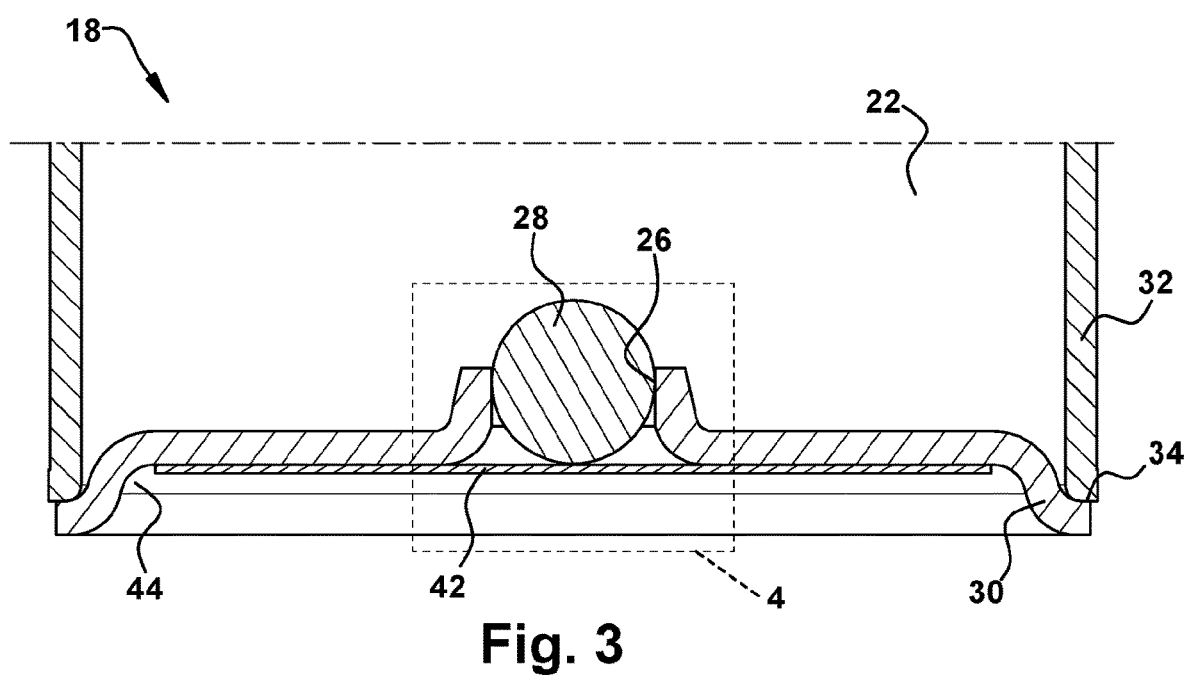
FIG. 3 is a cross-sectional side view of the portion of the thermal sensor assembly shown in FIG. 2.

The cover 42 may be made of any suitable material to provide the desired holding force against the ball 28 and/or for facilitating attachment of the cover 42 to the bulb 18. For example, the cover 42 may be made of a suitable metal that provides a desired amount of strength that withstands the force exerted by the ball 28 caused by changes in pressure of the sensing fluid inside the bulb 18. As an example, the bulb 18 may be designed to withstand an internal pressure of about 3,000 psi. The thickness of the cover may be about 0.005-in thick. The cover 42 also may include a material that facilitates attachment via welding to the exterior surface of the bulb 18. For example, as shown in FIG. 2, an ultrasonic welding process may be applied to a region 50 of the cover 42 which welds the cover 42 to the corresponding region of the cap 30 of the bulb 18. To facilitate such an ultrasonic welding process, the cover 42 may be made with copper or copper alloy (or have an outer layer of such material) that welds with the copper or copper-alloy layer 37 of the cap 30. The ultrasonic welding process of the cover 42 to the bulb 18 produces a strong joint at a low temperature, which reduces risk of combustion of the charging gas, and increases the burst strength by securing the ball 28 in the charge opening 26.

Figure 5:
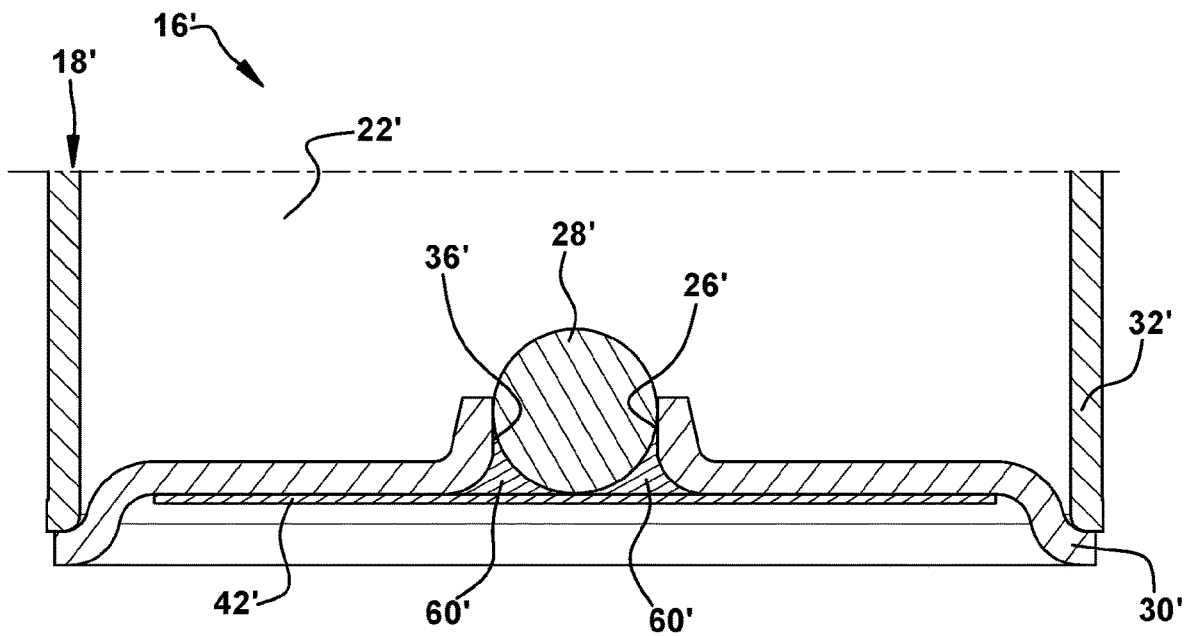
FIG. 5 is a cross-sectional side view of a portion of another exemplary thermal sensor assembly according to another embodiment of the present disclosure.

In exemplary embodiments, the structural configuration of the charge opening 26 also may improve assembly and/or sealability of the sensing bulb assembly 16. For example, in the illustrated embodiment, the charge opening 26 includes a lead-in hole (also referenced with 26) that extends axially toward the enclosed interior space 22 of the bulb 18. The lead-in hole 26 includes the sealing surface 36 which faces radially inwardly to engage the outer surface of the ball 28. As shown, the lead-in hole 26 may be tapered such that the sealing surface 36 tapers radially inwardly toward the ball 28 in the direction of the enclosed interior space 22 of the bulb 18. Because the bulb 18 is cylindrical in the illustrated embodiment, the tapered lead-in hole 26 forms a frustoconical structure 52 that protrudes into the enclosed interior space 22. The tapering of the lead-in hole 26 enables improved alignment and centering of the ball 28 to form the seal. The tapered lead-in hole 26 also may provide an outward spring-biasing force against the ball 28 which may facilitate assembly when inserting the ball 28 into the charge opening 26. The cover 42 that holds the ball 28 in the charge opening 26 may be adapted to counteract this spring-biasing force to hold the ball 28 in the charge opening 26. The lead-in hole 26 may be formed in any suitable manner, such as by extruding, punching, molding, or the like. Turning now to FIG. 5, another exemplary embodiment of a thermal sensor assembly 16' is shown. The thermal sensor assembly 16' is substantially the same as the above-referenced thermal sensor assembly 16, and consequently the same reference numerals, but with a prime (') indicator, are used to denote structures corresponding to the same or similar structures in the sensor assemblies 16, 16'. In addition, the foregoing description of the sensor assembly 16 is equally applicable to the sensor assembly 16', except as noted below. It is also understood that aspects of the sensor assemblies 16, 16' may be substituted for one another or used in conjunction with one another where applicable.

Similarly to the sensor assembly 16, the sensor assembly 16' generally includes an enclosure 18' which is in the form of a bulb 18' that encloses an interior space 22', the bulb 18' having a first opening (not shown in FIG. 5) for fluidly connecting to capillary tube 20 (not shown in FIG. 5), and a second (charge) opening 26' for charging the thermal sensing fluid into the bulb 18'. A ball 28' is arranged in the charge opening 26' to form a seal at the ball-hole joint which fluidly seals thermal sensing fluid in the enclosed interior space 22' of the bulb 18'. The charge opening 26' may include a tapered lead-in hole, which may be formed in a cap 30' attached to a major body portion 32' of the bulb 18'. A softer sealing surface 36', such as a copper layer on the cap 30', may be provided to enhance conformability and form a gasket with a harder sealing interface 35', such as the outer surface of the ball 28'. A cover 42' may be attached to the bulb 18' for holding the ball 28' in the charge opening 26'.

In the embodiment illustrated in FIG. 5, the thermal sensor assembly 16'(also referred to as thermal sensing bulb assembly 16') further includes an adhesive 60' disposed in a gap 54 (shown in FIG. 4) formed by a region between the cover 42', the ball 28', and the surface forming the charge opening 26' (e.g., surface of the cap 30'). The adhesive 60' bonds to two or more of these components to increase the strength of the ball-hole joint and improve the functionality of the seal. The adhesive 60' also may mitigate the effects of galvanic corrosion between the components. Although shown as being disposed in the gap 54 within a region formed by the cover 42', it is also understood that the adhesive 60' may be used without the cover 42' by applying the adhesive 60'at the ball-hole joint formed at the interface between the ball 28' and the sealing surface of the charge opening 26', whereby the adhesive 60' increases the strength of the joint.

In exemplary embodiments, the adhesive 60' is a UV-curable high-strength methacrylate retaining compound, such as Loctite® (e.g., Loctite 661). In laboratory tests, the use of such an adhesive 60' at the ball-hole joint increases the burst strength of the seal. For example, in the laboratory tests, the ball seal according to FIGS. 3 and 4 (without adhesive) reached a burst test strength in a range from 1,500 psi to 2,600 psi; whereas the ball seal according to FIG. 5 (with adhesive at the ball-hole joint) reached a burst test strength above 3,000 psi at which point the bulb 18' consistently failed at the weld between the cap 30' and the main bulb body 32'.

Figure 6:
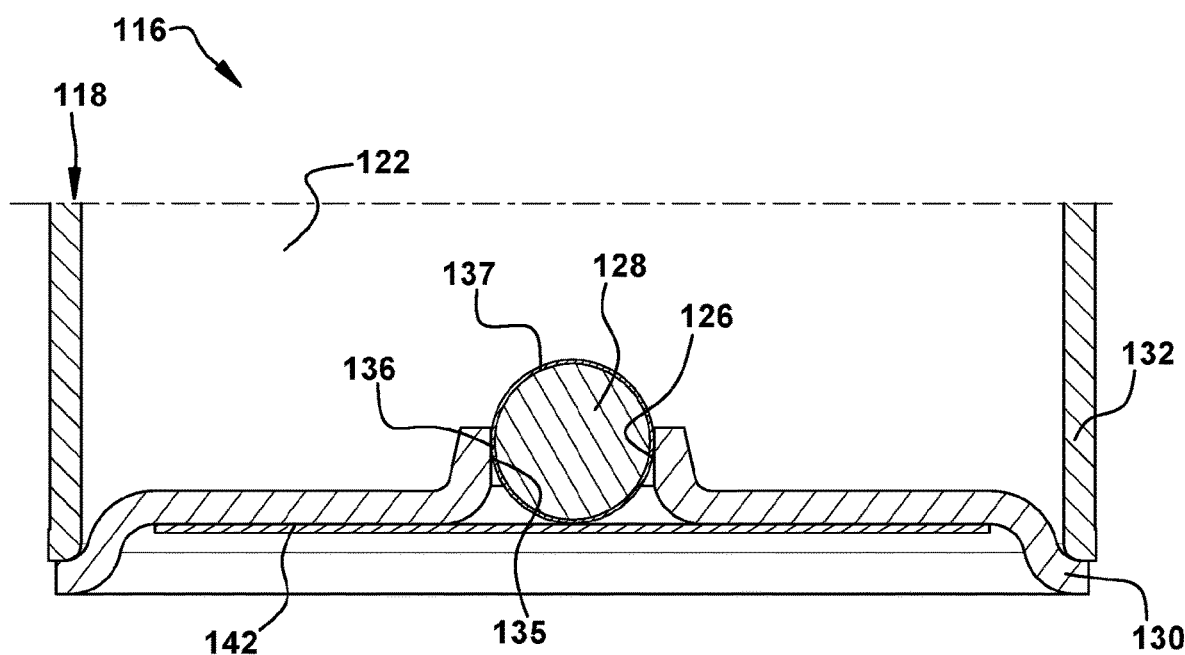
FIG. 6 is a cross-sectional side view of a portion of another exemplary thermal sensor assembly according to another embodiment of the present disclosure.

Turning to FIG. 6, another exemplary embodiment of a thermal sensor assembly 116 is shown. The thermal sensor assembly 116 is substantially similar to the above-referenced thermal sensor assembly 16, and consequently the same reference numerals but indexed by 100 are used to denote structures corresponding to the same or similar structures in the sensor assemblies 16, 116. In addition, the foregoing description of the sensor assembly 16 or 16' is equally applicable to the sensor assembly 116, except as noted below. It is also understood that aspects of the sensor assemblies 16, 16', 116 may be substituted for one another or used in conjunction with one another where applicable.

Similarly to the sensor assembly 16, the sensor assembly 116 generally includes an enclosure 118 which is in the form of a bulb 118 that encloses an interior space 122, the bulb 118 having a first opening (not shown in FIG. 5) for fluidly connecting to capillary tube 20 (not shown in FIG. 5), and a second (charge) opening 126 for charging the thermal sensing fluid into the bulb 118. A ball 128 is arranged in the charge opening 126 to form a seal at the ball-hole joint which fluidly seals thermal sensing fluid in the enclosed interior space 122 of the bulb 118. The charge opening 126 may include a tapered lead-in hole, which may be formed in a cap 130 attached to a major body portion 132 of the bulb 118. A cover 142 may be attached to the bulb 118 for holding the ball 128 in the charge opening 126, as described above.

Also similarly to the sensor assembly 16 described above, the ball 128 of the sensor assembly 116 is arranged in the charge opening 126 to form a fluid seal between a sealing surface 136 and a sealing interface 135, in which the sealing interface 135 is formed by a first material and the sealing surface 136 is formed by a second, different material having a greater softness than the first material, such that the sealing surface 136 conforms to the sealing interface 135 and fluidly seals the thermal sensing fluid in the enclosed interior space 122 of the enclosure 118. In contrast with the sensor assembly 16, however, the sensor assembly 116 has the softer sealing surface 136 on the ball 128 and the harder sealing interface 135 formed by the charge opening 126. As shown, the sealing surface 136 may be formed by a layer 137 of softer material around a harder material core of the ball 128. For example, the ball 128 may be made with steel and have a copper or copper-alloy coating that forms sealing surface 136. The portion of the enclosure 118 forming the charge opening 126 (e.g., the cap 130) may be made with steel or a harder alloy than the copper or copper-alloy layer 137 on the ball 128.

Figure 4:
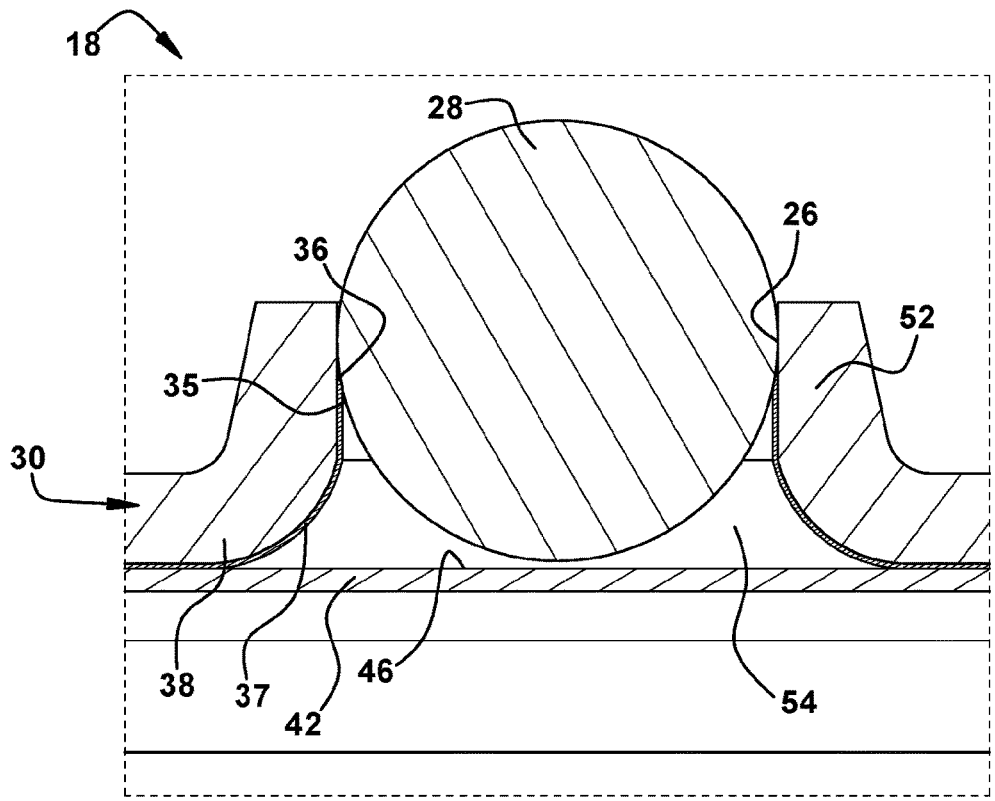
FIG. 4 is an enlarged cross-sectional side view from the broken line segment shown in FIG. 3.

It is understood that although the sealing surface 36, 136 is shown as a layer in the embodiments of FIGS. 4 and 6, the entire component having the sealing surface 36 (e.g., the cap 30) or the sealing surface 136 (e.g., the ball 128) could be made of the softer material (e.g., a copper ball 128 instead of a copper-coated steel ball 128). However, the harder substrate underlying the coating or layer constituting the sealing surface 36, 136 may improve strength performance of the sensor assembly. Likewise, although the sealing interface 35, 135 is shown as the entire component, such component may have a harder coating applied thereto to provide the harder sealing interface 35, 135.

Figure 7:
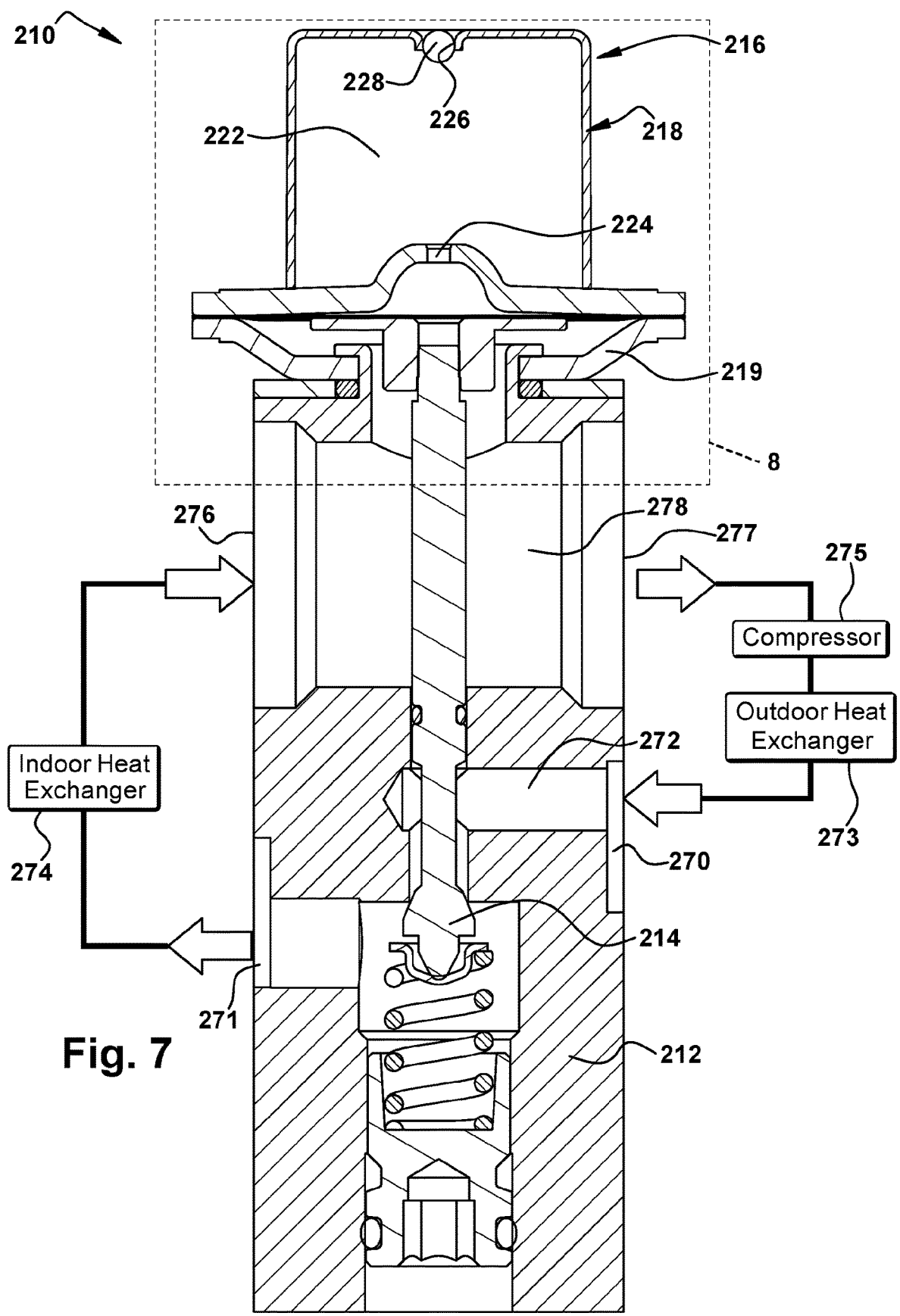
FIG. 7 is a cross-sectional side view of another exemplary thermal sensor assembly mounted to an exemplary thermostatic expansion valve according to another embodiment of the present disclosure.
Figure 8:
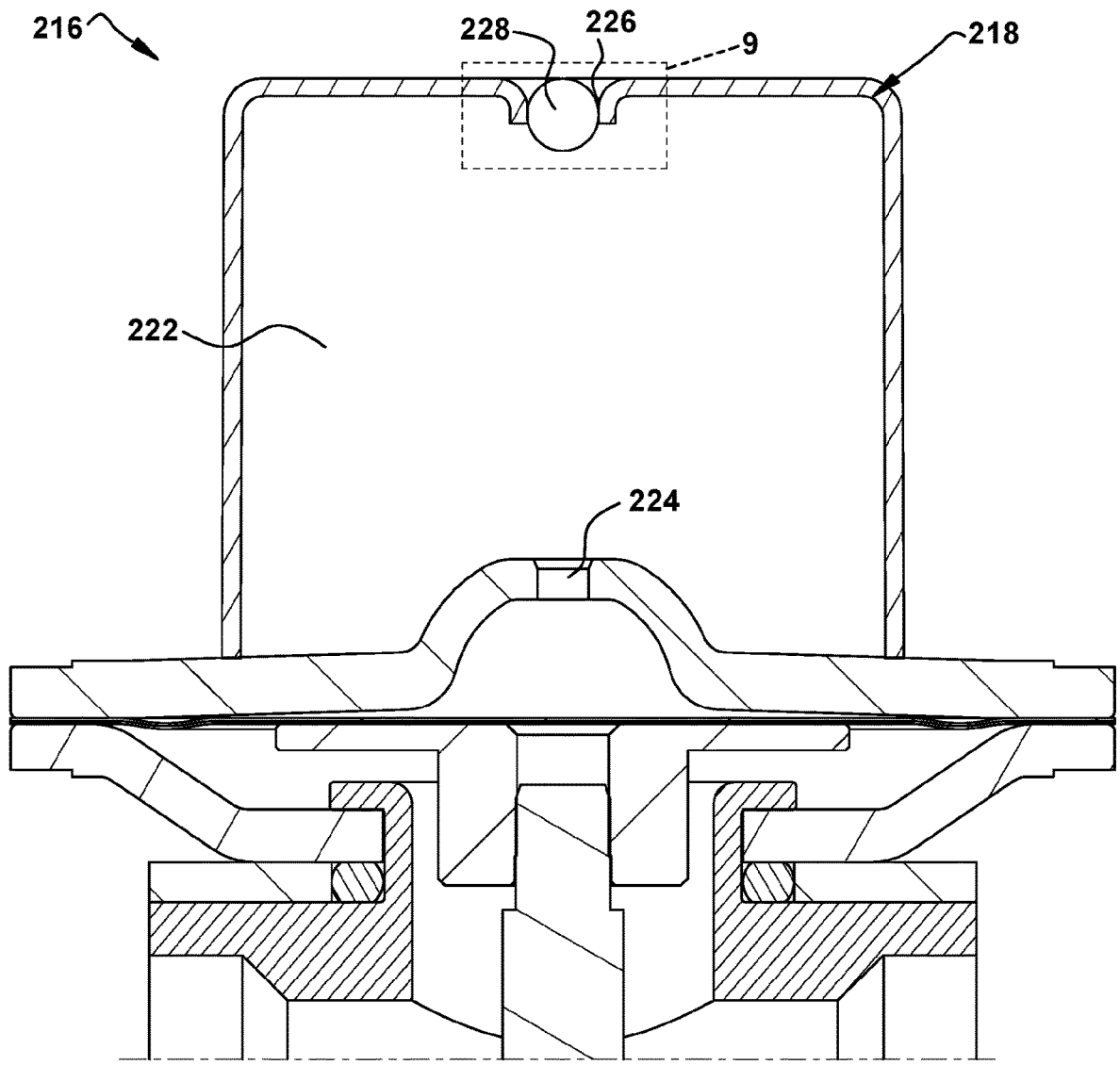
FIG. 8 is an enlarged view of the thermal sensor assembly shown in FIG. 7.
Figure 9:
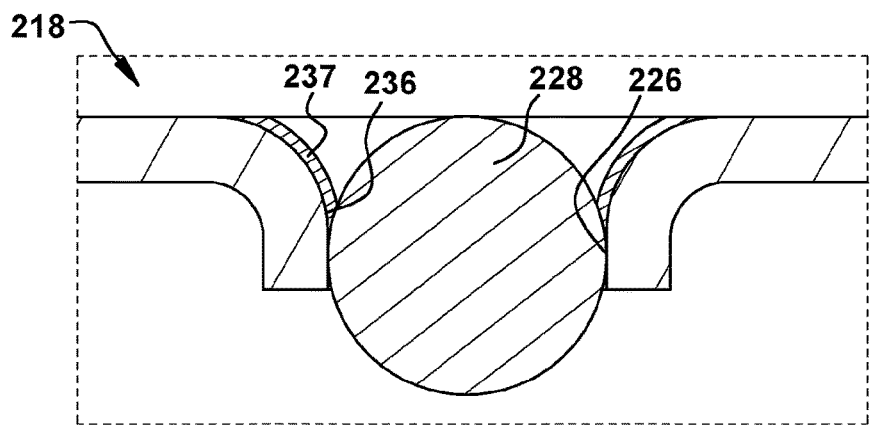
FIG. 9 is a further enlarged view of a portion of the thermal sensor assembly shown in FIG. 8.

Turning to FIGS. 7-9, another exemplary embodiment of a thermal sensor assembly 216 is shown. The thermal sensor assembly 216 is similar to the above-referenced thermal sensor assemblies 16, 116, and consequently the same reference numerals but in the 200-series are used to denote structures corresponding to the same or similar structures in the sensor assemblies 16, 116, 216. In addition, the foregoing description of the sensor assemblies 16, 116 are equally applicable to the sensor assembly 216, except as noted below. It is also understood that aspects of the sensor assemblies 16, 116, 216 may be substituted for one another or used in conjunction with one another where applicable.

In the illustrated embodiment of FIGS. 7-9, the thermostatic expansion valve (TEV) 210 is a bulbless-style thermal expansion valve in which the thermal sensor assembly 216 is operatively mounted to a valve body 212 of the TEV 210. The thermal sensor assembly 216 generally includes an exemplary enclosure 218 that contains a thermal sensing fluid, in which the enclosure 218 is in the form of a dome (also referred to with 218) that is mounted atop the valve body 212.

The bulbless TEV 210 generally includes valve body 212 having a first inlet 270, a first outlet 271, and a first main flow passage 272 extending from the first inlet 270 to the first outlet 271. As shown, the TEV 210 is arranged between an outdoor heat exchanger 273 and an indoor heat exchanger 274 of the refrigerant system. The TEV first inlet 271 is fluidly connected to an outlet of the outdoor heat exchanger 273 to receive operating fluid in the forward flow expansion mode, and the TEV first outlet 271 is fluidly connected to an inlet of the indoor heat exchanger 274. As is conventional in a refrigerant system, the system also includes a compressor 275 positioned between the outlet of the indoor heat exchanger 274 (evaporator) and the inlet of the outdoor heat exchanger 273 (condenser). In the illustrated embodiment, the valve body 212 of the TEV 210 forms at least a portion of the fluid (suction) line between the indoor heat exchanger 274 and the compressor 275. As shown, the valve body 212 includes a second inlet 276 fluidly connected to the outlet of the indoor heat exchanger 274 (evaporator), and a second outlet 277 fluidly connected to the inlet of the compressor 275. The valve body 212 forms a second main flow passage 278 extending from the second inlet 276 to the second outlet 277, in which this second main flow passage 278 is fluidly separated from the first main flow passage 272 in the valve body 212.

To control the amount of expansion from the first inlet 270 to the first outlet 270, the TEV 212 includes a valve member 214 that is controlled by a power element 219 for modulating flow of refrigerant through the valve 212. The power element 219 serves as an actuator to the valve member 214, and may include a diaphragm or other suitable structure that is responsive to a pressure signal from the sensing dome 218 to open or close the valve member 218 for dynamically modulating flow of refrigerant through the TEV 212. In the illustrated embodiment, instead of providing a connection via a capillary tube, the enclosure (dome) 218 of the bulbless TEV 212 communicates the pressure signal in response to changes in temperature of the sensing fluid via opening 224 which acts against the diaphragm of the power element 219. To provide adequate temperature sensing to control the TEV 212, the sensing dome 218 may be in fluid communication with, or in close proximity to, the suction line of the system. One exemplary description of such operation is disclosed in International Application No. PCT/US2022/027417 filed May 3, 2022, which is incorporated herein by reference in its entirety.

Similarly to the enclosure 18 of the sensor assembly 16, the enclosure 218 of the sensor assembly 216 includes a charge opening 226 for charging the thermal sensing fluid into the dome 218. A ball 228 is arranged in the charge opening 226 to form a seal at the ball-hole joint which fluidly seals thermal sensing fluid in the enclosed interior space 222 of the dome 218. As best shown in FIG. 8, similarly to the enclosure 18, a sealing surface 236 that is softer than that of the ball 228 may be provided to enhance conformability and form a gasket with the outer surface of the ball 228. For example, the dome 218 may include a copper or copper alloy layer 237 on the dome 218 that forms the sealing surface 236 which conforms to the steel ball 228. As shown, similarly to the enclosure 18, the charge opening 226 may include a tapered lead-in hole which protrudes into the enclosed interior space 222. An adhesive (not shown) may be applied at the ball-hole joint formed at the interface between the ball 228 and the sealing surface 236 of the charge opening 226, in which the adhesive 260 increases the strength of the joint. Although not shown, a cover (similarly to the cover 42) may be attached to the enclosure (dome) 218 for holding the ball 228 in the charge opening 226.

Exemplary embodiment(s) of a thermal sensor assembly for a thermostatic expansion valve have been described herein.

According to at least one aspect of the present disclosure, a bulb assembly that is used as a sensing bulb for a TEV includes a bulb defining an enclosed space with an opening that is end-capped by a bulb cap. A capillary tube is connected to another end of the bulb that is opposite to the bulb cap. The bulb cap contains an extruded hole that protrudes into the interior of the bulb, wherein the extruded hole is sealed shut by a ball and a sealant.

According to another aspect, a bulb assembly that is used as a sensing bulb for a TEV includes a bulb defining an enclosed space with an opening that is end-capped by a bulb cap. A capillary tube is connected to another end of the bulb that is opposite to the bulb cap. The bulb cap has an extruded hole that protrudes into the interior of the bulb, wherein the extruded hole is sealed shut by a ball and a disc.

According to another aspect, a method of sealing a bulb assembly includes charging a refrigerant into the bulb assembly through the extruded hole on the bulb cap. Once the refrigerant is inside the bulb assembly and the connected capillary tubing, a ball is pressed into the extruded hole. The ball is pressed to a depth so that it is flat with the cap. This ball seals the bulb assembly so that the refrigerant cannot leak out. An adhesive is added to the cap and ball joint to increase the strength of the joint.

According to another aspect, a method of sealing a bulb assembly includes charging a bulb assembly with refrigerant through the extruded hole on the bulb cap. Once the refrigerant is inside the bulb assembly and the connected capillary tubing, a ball is pressed into the extruded hole. A disc is attached directly against the ball and the bulb cap, and the ball is pressed to a depth so that it is flat with the disc. This ball and the disc seal the bulb assembly so that the refrigerant cannot leak out.

According to another aspect, a thermal sensor assembly for a thermostatic expansion valve includes: an enclosure forming an enclosed interior space containing a thermal sensing fluid, the enclosure having a charge opening configured for charging the thermal sensing fluid into the enclosure; a ball arranged in the charge opening and forming a fluid seal between a sealing surface and a sealing interface; wherein the sealing interface is formed by a first material and the sealing surface is formed by a second material having a greater softness than the first material such that the sealing surface conforms to the sealing interface and fluidly seals the thermal sensing fluid in the enclosed interior space of the enclosure.

Exemplary embodiments may include one or more of the following additional features, separately or in any combination.

In exemplary embodiments, the sealing surface is formed by at least a portion of the charge opening of the enclosure, and the sealing interface is formed by an outer surface of the ball, such that the sealing surface of the charge opening conforms to the outer surface of the ball.

In exemplary embodiments, the sealing surface is formed by at least a portion of the ball, and the sealing interface is formed by a surface of the charge opening of the enclosure, such that the sealing surface of the ball conforms to the surface of the charge opening.

In exemplary embodiments, the enclosure includes the second material as a first layer on at least part of the enclosure, and a third material as a substrate layer of at least part of the enclosure that supports the first layer, the third material of the substrate layer being harder than the second material of the first layer to enhance a strength of the enclosure.

In exemplary embodiments, the ball includes the second material as a first layer on at least part of the ball, and a third material as a substrate layer of at least part of the ball that supports the first layer, the third material of the substrate layer being harder than the second material of the first layer to enhance a strength of the ball.

In exemplary embodiments, the first material is steel, the second material is copper or copper alloy, and the third material is steel.

In exemplary embodiments, the portion of the enclosure having the charge opening is formed as a cap that is attached to a main body portion of the enclosure.

In exemplary embodiments, the thermal sensor assembly further includes a cover attached to an exterior surface of the enclosure such that the cover holds the ball in the charge opening to form the seal.

In exemplary embodiments, the cover is formed as a flat disc, and wherein the ball is sized to fit in the charge opening such that the ball does not protrude beyond a flat of the disc.

In exemplary embodiments, the cover is ultrasonically welded to the enclosure.

In exemplary embodiments, the portion of the enclosure having the sealing surface is formed as a cap that is attached to a main body portion of the enclosure, wherein the cap forms a recessed portion of the enclosure, and the cover is configured to fit within the recessed portion of the enclosure.

In exemplary embodiments, a joint is formed at the interface between the ball and the sealing surface of the charge opening, the joint including an adhesive that increases the strength of the joint.

In exemplary embodiments, the charge opening includes a lead-in hole that includes the sealing surface which faces radially inwardly toward the ball.

In exemplary embodiments, the sealing surface of the lead-in hole tapers radially inwardly as the sealing surface extends toward the enclosed interior space of the enclosure.

In exemplary embodiments, the lead-in hole is formed by a frustoconical portion of the enclosure that includes the sealing surface, the frustoconical portion of the enclosure protruding into the enclosed interior space of the enclosure.

In exemplary embodiments, the thermal sensor assembly further includes a cover attached to the enclosure, the cover being configured to hold the ball in the charge opening to form the seal, and wherein the frustoconical portion of the enclosure provides a spring bias that urges the ball toward the cover to hold the ball.

According to another aspect, a thermal sensor assembly for a thermostatic expansion valve, includes: an enclosure forming an enclosed interior space containing a thermal sensing fluid, the bulb having a charge opening configured for charging the thermal sensing fluid into the enclosure; and a ball arranged in the charge opening and forming a seal that fluidly seals the thermal sensing fluid in the enclosed interior space of the enclosure; wherein the charge opening includes a tapered lead-in hole formed by a portion of the enclosure, the lead-in hole including a tapered surface that tapers radially inwardly as the tapered surface extends toward the enclosed interior space, the tapered surface sealingly engaging against the ball to form the seal.

Exemplary embodiments may include one or more of the following additional features, separately or in any combination.

In exemplary embodiments, the lead-in hole is formed by a frustoconical portion of the enclosure that includes a sealing surface, the frustoconical portion of the enclosure protruding into the enclosed interior space of the enclosure.

In exemplary embodiments, the thermal sensor assembly further includes a cover attached to the enclosure, the cover being configured to hold the ball in the charge opening to form the seal, and wherein the frustoconical portion of the enclosure provides a spring bias that urges the ball toward the cover to hold the ball.

According to another aspect, a thermal sensor assembly for a thermostatic expansion valve, includes: an enclosure forming an enclosed interior space containing a thermal sensing fluid, the enclosure having a charge opening configured for charging the thermal sensing fluid into the enclosure; a ball arranged in the charge opening and forming a seal that fluidly seals the thermal sensing fluid in the enclosed interior space of the enclosure; and a cover attached to an exterior surface of the enclosure and configured to hold the ball in the charge opening to form the seal.

Exemplary embodiments may include one or more of the following additional features, separately or in any combination.

In exemplary embodiments, the cover is formed as a flat disc, and wherein the ball is sized to fit and seal in the charge opening such that the ball does not protrude beyond a flat of the disc.

According to another aspect, a thermostatic expansion valve is coupled to the thermal sensor assembly according to any of the foregoing, wherein: the enclosure includes a second opening separate from the charge opening, the second opening being fluidly connected to a power element of the thermostatic expansion valve.

Exemplary embodiments of the foregoing aspect may include one or more of the following additional features, separately or in any combination.

In exemplary embodiments, the enclosure is in the form of a bulb, and the second opening is fluidly connected to a capillary tube that is connected to the power element, the capillary tube being configured to enable the bulb to be mounted at a remote location relative to the thermostatic expansion valve.

In exemplary embodiments, the enclosure is formed as a dome that is mounted to a valve body of the thermostatic expansion valve, and the second opening is in fluid communication with a diaphragm of the power element of the thermostatic expansion valve.

According to another aspect, a method of sealing an enclosure of a thermal sensor assembly for a thermal expansion valve includes the steps: attaching a cap to an opening end of the enclosure; forming a charge hole on the cap; charging a refrigerant into the enclosure through the charge hole; and pressing a ball into the charge hole, wherein the ball is larger in size than the charge hole and forms a fluid seal between a sealing surface and a sealing interface of the assembly; wherein the sealing interface is formed by a first material and the sealing surface is formed by a second material having a greater softness than the first material such that the sealing surface conforms to the sealing interface and fluidly seals the thermal sensing fluid in the enclosed interior space of the enclosure.

According to another aspect, a method of sealing an enclosure of a thermal sensor assembly for a thermal expansion valve includes the steps: attaching a cap to an opening end of the enclosure; forming a charge hole on the cap; charging a refrigerant into the enclosure through the charge hole; and pressing a ball into the charge hole, wherein the ball is larger in size than the charge hole to form a seal; wherein the charge opening is formed as a lead-in hole that protrudes into the enclosed interior surface of the enclosure, the lead-in hole having a tapered surface that tapers radially inwardly toward the enclosed interior space and sealingly engages against the ball to form the seal.

According to another aspect, a method of sealing an enclosure of a thermal sensor assembly for a thermal expansion valve includes the steps: attaching a cap to an opening end of the enclosure; forming a charge hole on the cap; charging a refrigerant into the enclosure through the charge hole; pressing a ball into the charge hole, wherein the ball is larger in size than the charge hole to form a seal; and attaching a cover to the cap to hold the ball in the charge hole and form the seal.

The term "hardness" as used herein means the resistance of a material to deformation, particularly permanent deformation, indentation, or scratching, as measured under specified conditions, such as a standardized indentation hardness test (e.g., Rockwell, Brinell, Vickers, nanoindentation), or the like.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A thermal sensor assembly for a thermostatic expansion valve, the thermal sensor assembly comprising:
   an enclosure forming an enclosed interior space containing a thermal sensing fluid, the enclosure having a charge opening configured for charging the thermal sensing fluid into the enclosure;
   a ball arranged in the charge opening and having a sealing interface; and
   a sealing surface layer located between a surface of the charge opening of the enclosure and the sealing interface of the ball forming a fluid seal between the enclosure at the charge opening and the ball;
   wherein the sealing interface is formed by a first material and the sealing surface layer is formed by a second material having a greater softness than the first material such that the sealing surface layer conforms to the sealing interface and fluidly seals the thermal sensing fluid in the enclosed interior space of the enclosure at the charge opening,
   wherein the sealing interface is formed by an outer surface of the ball, such that the sealing surface layer at the charge opening conforms to the outer surface of the ball, and
   wherein the enclosure includes a third material as a substrate layer for the sealing surface layer, the third material of the substrate layer being harder than the second material of the sealing surface layer to enhance a strength of the enclosure.

2. The thermal sensor assembly according to claim 1, wherein the enclosure includes a second sealing interface formed by a surface of the charge opening of the enclosure, such that the sealing surface layer conforms to the surface of the charge opening.

3. The thermal sensor assembly according to claim 2, wherein the ball includes the sealing surface layer of the second material as a first layer on at least part of the ball, and a third material as a substrate layer of at least part of the ball that supports the first layer, the third material of the substrate layer being harder than the second material of the first layer to enhance a strength of the ball.

4. The thermal sensor assembly according to claim 1, wherein the first material is steel, the second material is copper or copper alloy, and the third material is steel.

5. The thermal sensor assembly according to claim 1, wherein the portion of the enclosure having the charge opening is formed as a cap that is attached to a main body portion of the enclosure.

6. The thermal sensor assembly according to claim 1, wherein the thermal sensor assembly further includes a cover attached to an exterior surface of the enclosure such that the cover holds the ball in the charge opening to form the seal.

7. The thermal sensor assembly according to claim 6, wherein the cover is formed as a flat disc, and wherein the ball is sized to fit in the charge opening such that the ball does not protrude beyond a flat of the disc.

8. The thermal sensor assembly according to claim 6, wherein the cover is ultrasonically welded to the enclosure.

9. The thermal sensor assembly according to claim 6, wherein the portion of the enclosure adjacent the sealing surface layer is formed as a cap that is attached to a main body portion of the enclosure, wherein the cap forms a recessed portion of the enclosure, and the cover is configured to fit within the recessed portion of the enclosure.

10. The thermal sensor assembly according to claim 1, wherein a joint is formed at the interface between the ball and the sealing surface layer at the charge opening, the joint including an adhesive that increases the strength of the joint.

11. The thermal sensor assembly according to claim 1, wherein the charge opening includes a lead-in hole adjacent the sealing surface layer which faces radially inwardly toward the ball.

12. The thermal sensor assembly according to claim 11, wherein the sealing surface layer at the lead-in hole tapers radially inwardly as the sealing surface layer extends toward the enclosed interior space of the enclosure.

13. The thermal sensor assembly according to claim 12, wherein the lead-in hole is formed by a frustoconical portion of the enclosure adjacent the sealing surface layer, the frustoconical portion of the enclosure protruding into the enclosed interior space of the enclosure.

14. The thermal sensor assembly according to claim 13, wherein the thermal sensor assembly further includes a cover attached to the enclosure, the cover being configured to hold the ball in the charge opening to form the seal, and wherein the frustoconical portion of the enclosure provides a spring bias that urges the ball toward the cover to hold the ball.

15. A thermal sensor assembly for a thermostatic expansion valve, the thermal sensor assembly comprising:
an enclosure forming an enclosed interior space containing a thermal sensing fluid, the bulb having a charge opening configured for charging the thermal sensing fluid into the enclosure; and
a ball arranged in the charge opening and forming a seal that fluidly seals the thermal sensing fluid in the enclosed interior space of the enclosure;
wherein the charge opening includes a tapered lead-in hole formed by a portion of the enclosure, the lead-in hole including a tapered surface that tapers radially inwardly as the tapered surface extends toward the enclosed interior space, the tapered surface sealingly engaging against the ball to form the seal,
wherein a sealing interface of the ball forming a fluid seal between the enclosure at the charge opening and the ball is formed by a first material and a sealing surface layer located between a surface of the charge opening and the sealing interface is formed by a second material having a greater softness than the first material such that the sealing surface layer conforms to the sealing interface,
wherein the sealing interface is formed by an outer surface of the ball, such that the sealing surface layer at the charge opening conforms to the outer surface of the ball, and
wherein the enclosure includes a third material as a substrate layer for the sealing surface layer, the third material of the substrate layer being harder than the second material of the sealing surface layer to enhance a strength of the enclosure.

16. The thermal sensor assembly according to claim 15, wherein the lead-in hole is formed by a frustoconical portion of the enclosure that includes a sealing surface, the frustoconical portion of the enclosure protruding into the enclosed interior space of the enclosure.

17. The thermal sensor assembly according to claim 16, wherein the thermal sensor assembly further includes a cover attached to the enclosure, the cover being configured to hold the ball in the charge opening to form the seal, and wherein the frustoconical portion of the enclosure provides a spring bias that urges the ball toward the cover to hold the ball.

18. A thermal sensor assembly for a thermostatic expansion valve, the thermal sensor assembly comprising:
an enclosure forming an enclosed interior space containing a thermal sensing fluid, the enclosure having a charge opening configured for charging the thermal sensing fluid into the enclosure;
a ball arranged in the charge opening and forming a seal that fluidly seals the thermal sensing fluid in the enclosed interior space of the enclosure; and
a cover attached to an exterior surface of the enclosure and configured to hold the ball in the charge opening to form the seal;
wherein the cover is formed as a flat disc, and wherein the ball is sized to fit and seal in the charge opening such that the ball does not protrude beyond a flat of the disc.

* * * * *